United States Patent
Xu et al.

(10) Patent No.: US 11,882,216 B1
(45) Date of Patent: Jan. 23, 2024

(54) END-TO-END HARDWARE ACCELERATION FOR ZKP FROM WITNESS GENERATION TO PROOF GENERATION

(71) Applicant: Auradine, Inc., Santa Clara, CA (US)

(72) Inventors: Patrick Xu, Saratoga, CA (US); Minglei Wang, Sunnyvale, CA (US); Sidong Li, Saratoga, CA (US); De Vu, Livermore, CA (US); Saptadeep Pal, Cupertino, CA (US); Lei Chang, Saratoga, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 18/214,462

(22) Filed: Jun. 26, 2023

Related U.S. Application Data

(63) Continuation of application No. 18/207,620, filed on Jun. 8, 2023.

(51) Int. Cl.
   *H04L 9/08*      (2006.01)
(52) U.S. Cl.
   CPC ................................... *H04L 9/088* (2013.01)
(58) Field of Classification Search
   CPC ........................................................ H04L 9/088
   See application file for complete search history.

(56) References Cited

U.S. PATENT DOCUMENTS

| | | | | |
|---|---|---|---|---|
| 10,652,019 B1* | 5/2020 | Nicolas | ................. | H04L 9/3239 |
| 10,951,410 B1* | 3/2021 | Jeong | .................... | H04L 9/3221 |
| 11,546,161 B2* | 1/2023 | Ng | ......................... | H04L 9/3066 |
| 11,546,162 B2* | 1/2023 | Covaci | ................... | H04L 9/0825 |
| 11,575,511 B2* | 2/2023 | Covaci | ................ | G06F 9/44521 |
| 2016/0098558 A1* | 4/2016 | Vedula | ..................... | G06F 21/72 726/23 |
| 2019/0190701 A1* | 6/2019 | Mitra | ..................... | G06N 5/022 |
| 2019/0372768 A1* | 12/2019 | Veeningen | ................ | H04L 9/14 |
| 2020/0267547 A1* | 8/2020 | Tal | ........................ | H04L 9/3239 |
| 2020/0396075 A1* | 12/2020 | Visegrady | ............. | H04L 9/3234 |
| 2021/0044428 A1* | 2/2021 | Hwang | .................. | H04L 9/3239 |
| 2021/0056227 A1* | 2/2021 | Xu | ............................. | H04L 9/50 |
| 2021/0266168 A1* | 8/2021 | Ng | ........................ | G06F 17/142 |

* cited by examiner

*Primary Examiner* — Phy Anh T Vu
(74) *Attorney, Agent, or Firm* — Shield Intellectual Property PC; Zhichong Gu

(57) ABSTRACT

A local buffer is integrated with a witness generator and a proof generator on a cryptographic processor and is separate from host memory accessed by a host processor operating with the cryptographic processor in a proving computing system. The witness generator: receives, from software program running on the host processor, compiled code of a zero-knowledge-proof (ZKP) program and specific input to the ZKP program; executes the ZKP program by way of executing the compiled code; records specific output generated from the ZKP program with the specific input, intermediate variable values, and the specific input, as a specific witness of executing the ZKP program; stores the specific witness in the local buffer. The proof generator: receives, from the software program running on the host processor, a proving key; accesses the specific witness in the local buffer; generates a specific zero-knowledge proof for executing the ZKP program with the specific input.

18 Claims, 5 Drawing Sheets

US 11,882,216 B1

END-TO-END HARDWARE ACCELERATION FOR ZKP FROM WITNESS GENERATION TO PROOF GENERATION

PRIORITY CLAIM

This application claims benefit as a Continuation of application Ser. No. 18/207,620, filed Jun. 8, 2023, the entire contents of the aforementioned are hereby incorporated by reference as if fully set forth herein, under 35 U.S.C. § 120. The applicant hereby rescind any disclaimer of claim scope in the parent application or the prosecution history thereof and advise the USPTO that the claims in this application may be broader than any claim in the parent application.

TECHNICAL FIELD

Embodiments relate generally to computing systems, and, more specifically, to end-to-end hardware acceleration for ZKP from witness generation to proof generation in computing systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Zero-knowledge proof can be generated and used by computing systems in real-world applications to prove and validate a statement without the proving (or prover) computing system revealing the statement itself to the verifier computing system. For example, the proving computing system may prove the statement by way of proving access to or knowledge of a witness to hidden information or program execution relating to the statement.

A witness used by the proving computing system to generate a zero-knowledge proof typically includes numerous internal variable values and input or output parameters. Accessing the witness along with a proving key as input, the proving computing system can generate the zero-knowledge proof having a relatively small data size as compared with that of the witness.

The zero-knowledge proof can be readily validated or verified with little computational overhead and time latency by a verifier computing system having a verification key. In comparison, the proving computing system that generates the witness and zero-knowledge proof may incur relatively high computational costs, large memory usages and long latencies. To generate the witness and zero-knowledge proof, the proving computing system may need to execute numerous parallelized or serialized computations, tasks or routines of different types including but are not limited to generating, accessing, moving, and processing large amounts of computer generated data across multiple sub-systems and host processing logic.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
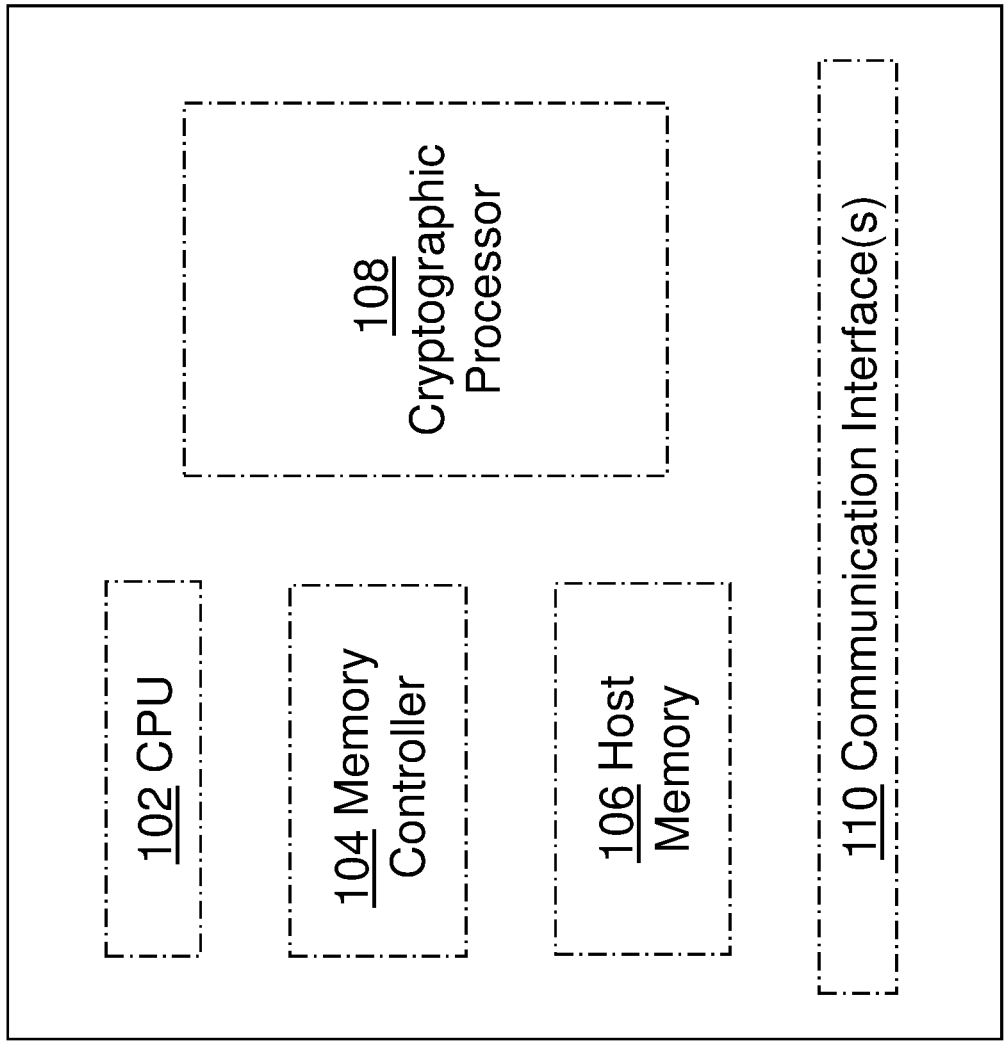
FIG. 1 illustrates an example proving computing system.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:
  1.0. General Overview
  2.0. Structural Overview
    2.1. Host Computing Processor
    2.2. Cryptographic Processor
    2.3. Memory Controller
    2.4. Host Memory
    2.5. Communication Interface(s)
    2.6. Witness Generator
    2.7. Proof Generator
    2.8. Local Buffer
    2.9. Miscellaneous
  3.0. Functional Overview
    3.1. Witness Generation
    3.2. Proof Generation
    3.3. Example Process Flows
  4.0. Implementation Mechanism—Hardware Overview
  5.0. Extensions and Alternatives

1.0. GENERAL OVERVIEW

In a proving computing system as described herein, a hardware accelerator—also referred to as acceleration hardware or cryptographic processor/engine—can be implemented as a single semiconductor chip or integrated circuit (IC). The hardware accelerator includes a relatively large number of (e.g., fast Fourier transformation or FFT, number theoretic transformation or NTT, multi-scalar multiplication or MSM, etc.) computational units for generating witnesses and corresponding proofs. In addition, the hardware accelerator includes local memory or data buffer(s) for storing or accessing input, intermediate and/or output data including but not limited to the witnesses. Hence, under these techniques, the witnesses can be generated or accessed in situ by the hardware accelerator or components/units therein without involving components or devices outside the hardware accelerator.

Some or all of the computation units deployed or provisioned in the hardware accelerator may operate in parallel to execute different computations of different types and/or of the same type over relatively big integers (e.g., 254-bit values, 256 (or more) bit values, etc.) and prime field elements. These computation units can be used to perform FFT/NTT, MSM and/or other optimized or parallelized computations for proof generation and/or witness generation.

The hardware accelerator may include a witness generator to access or receive a compiled ZKP (or cryptographic)

program or an equivalent arithmetic circuit as generated by a host processor operating in conjunction with the hardware accelerator. The witness generator can invoke computation units to execute the compiled ZKP program or arithmetic circuit with a given specific input. A witness can be generated by the witness generator or the computation units based at least in part on the specific input and then stored in the local memory or data buffer on the same hardware accelerator for a proof generator of the hardware accelerator to use the witness along with a proving key generated in a trusted setup to produce a zero-knowledge proof.

As compared with other approaches, hardware acceleration techniques as described herein may be used to avoid invoking host memory access operations in reading or accessing witnesses, which could take relatively long time to perform due to limited memory access bandwidth associated with accessing data items stored in the host memory.

In addition, the hardware acceleration techniques as described herein can significantly enhance or improve data security. Intermediate data generated and accessed during witness and proof generation including but not limited to witnesses can be stored locally rather than in host memory, which could be relatively susceptible to malicious access or snooping as compared with the local data buffer integrated with the witness and proof generators on the same hardware accelerator.

Approaches, techniques, and mechanisms as described herein support end-to-end hardware acceleration for ZKP from witness generation to proof generation in computing systems. A local witness buffer is integrated with a witness generator and a proof generator on a cryptographic processor and is separate from host memory accessed by a host processor operating with the cryptographic processor in a proving computing system. The witness generator: receives, from software program running on the host processor, compiled (or flattened) code of a zero-knowledge-proof (ZKP) program and specific input to the ZKP program; executes the ZKP program by way of executing the compiled code; records specific output generated from the ZKP program with the specific input, intermediate variable values, and the specific input, as a specific witness of executing the ZKP program; stores the specific witness in the local witness buffer. The proof generator: receives, from the software program running on the host processor, a proving key; accesses the specific witness in the local witness buffer; generates a specific zero-knowledge proof for executing the ZKP program with the specific input.

In other aspects, the inventive subject matter encompasses computer apparatuses and computer-readable media configured to carry out the foregoing techniques.

2.0. Structural Overview

FIG. 1 illustrates an example proving computing system (or device) 100 for witness and (zero-knowledge) proof generation in an embodiment. The proving computing system 100 comprises a host processor such as a central processing unit (CPU) 102, a host memory controller 104, host memory 106, a cryptographic processor (or engine) 108, one or more communication interfaces 110, and so on. Some or all of the processing components described herein are implemented in one or more of: central processing units (CPUs), application-specific integrated circuits (ASICs), field programmable gate arrays (FPGAs), microcontrollers, graphics processing units (GPUs), or other integrated circuit(s). Some or all of the processing components may include one or more memories storing instructions for implementing various components described herein, one or more hardware processors configured to execute the instructions stored in the one or more memories, and various data repositories in the one or more memories for storing data structures utilized and manipulated by the various components.

In various operational scenarios, the proving computing system 100 may include more or fewer processing components than illustrated in FIG. 1. For example, the proving computing system 100 may include computing devices or processing components in addition to or in place of the CPU 102, the host memory controller 104, the host memory 106, the cryptographic processor 108, the communication interfaces 110, and so on.

The proving computing system 100 may be operatively connected with one or more other computing systems through the communication interfaces 110 over a network of a plurality of computers or nodes.

2.1. Host Computing Processor

The proving computing system 100 may comprise a host processor or CPU 102 that interacts with the memory controller 104 to access and read instructions and/or data of one or more software programs stored in the host memory 106. Each of the software programs may invoke various components of the proving computing system 100 to generate witnesses and zero-knowledge proofs.

The one or more software programs may be executed by the host processor CPU 102 to perform operations to support or participate in operational frameworks under one or more different zero-knowledge proof (ZKP) protocols with some or all other computers or nodes in the network that includes the proving computing system 100. Some or all of the instructions and/or data read from the host memory 106 for executing the one or more software programs may be temporarily maintained or accessed by way of one or more CPU caches (level 1 cache, level 2 cache, etc.; outside the cryptographic processor 108; not shown) of the host processor or CPU 102.

The operations performed or driven by the software programs running on the host processor or CPU 102 may include, but are not necessarily limited to only, any, some or all of: compiling ZKP programs that access private information or data into corresponding compiled codes or arithmetic circuits; invoking or operating with the cryptographic processor 108 to execute the ZKP programs or corresponding compiled codes or arithmetic circuits with specific inputs; invoking or operating with the cryptographic processor 108 to generate witnesses for the invoked or executed ZKP programs; invoking or operating with the cryptographic processor 108 to generate ZKPs for the ZKP programs with the specific inputs based at least in part on the witnesses; and so on.

A ZKP program as described herein refers to a computer-implemented (e.g., secret, cryptographic, etc.) function or program or logic that accesses private information/data. Zero-knowledge proofs (ZKPs) are to be produced for executing the ZKP program with different inputs. Knowledge for the private information/data accessed by the ZKP program and for the ZKP program itself is not to be shared through the ZKPs by the proving computing system 100 with other computing systems such as verifier computing system(s) that receive or validate the ZKPs generated by the proving computing system 100.

In some operational scenarios, witnesses and corresponding ZKPs for the ZKP program can be generated by the cryptographic processor 108 operating in conjunction with or under the control of the one or more software programs executed by the host processor or CPU 102.

Example private information/data as described herein may include, but is not necessarily limited to only, any of: private transaction information or data; private computer-implemented functions or logics; private data field values accessed by computer programs, statements, functions, code generated or written in a computer language; private solution(s) to underlying equation(s) or to underlying system(s) of equations; private relationship(s) between or among two or more underlying (private or secret) data items; mathematical or logical relationship(s) between or among two or more underlying (private or secret) data items; private principal identity of a computer-implemented or encrypted transaction or exchange; private authorization keys; private authentication credentials; private events; private date and/or time information; private locational information, private electronic signing keys used in blockchain recorded encrypted transactions; inclusion in and/or exclusion from a private or encrypted authorized and/or authenticated user list; etc.

The host processor or CPU 102 can run a software program that supports a specific ZKP protocol or a specific ZKP operational framework. The software program running on the host processor or CPU 102 may invoke a compiler program to transform or compile a ZKP program into corresponding compiled code defining or specifying an arithmetic circuit equivalent to the ZKP program. The ZKP program to be transformed or compiled into the compiled code or arithmetic circuit may be initially written or generated in a (e.g., special purpose, etc.) computer programming language among one or more different computer programming languages supported by compiler program(s) configured with the proving computing system 100. Example compiler programs as described herein may include, but are not necessarily limited to only, any of: SNARK compilers; preprocessing SNARK compilers; DARK compilers; and so on.

The compiled code generated from transforming or compiling the ZKP program includes a plurality of elementary (code) statements or equations representing a plurality of gates. These gates together form the arithmetic circuit that may be walked graphically—or logically executed—from a specific input provided to the ZKP program all the way to a specific output generated by the ZKP program with the specific input. Each elementary statement in the plurality of the elementary statements represents a respective gate in the plurality of gates forming the arithmetic circuit. The variable on the left hand side (LHS) of the elementary statement may be represented as an output wire of the respective gate, whereas fixed/constant value(s) or variable(s) on the right hand side (RHS) of the elementary statement may be represented as input wire(s) of the respective gate.

The plurality of elementary statements in the compiled code compiled from the ZKP program may include assignment statements as well as operational statements. An assignment statement assigns, to a variable on the LHS of that statement, a fixed or constant value or a value of a second variable on the RHS of the statement. In comparison, an operational statement assigns, to a LHS variable of the statement, the result of a RHS operation performed with an operator on the RHS of that statement and two operands on each side of the operator. Each of the two operands may be a fixed or constant value or a variable value. The operator may belong to a relatively limited set of allowed operators (e.g., "+" or addition, "*" or multiplication, "−" or subtraction, "/" or division, etc.). Other operators such as modulo (%) and comparison operators (<, >, ≤, ≥) may be excluded from this relatively limited set of allowed operators.

Example fixed/constant values and/or variables in the elementary statements or gates as described herein may include input and output of the ZKP program as well as internal fixed/constant values and/or variables (or symbols or names or tokens) generated in transforming or compiling the ZKP program into the compiled code.

To help generate ZKPs for the ZKP program, the host processor or CPU 102 can operate with a trusted computing system to execute a trusted setup algorithm that uses a secret key to generate a common reference string (CRS) and split the CRS into a pair of a proving key and a verification key. In some operational scenarios, the host processor or CPU 102 may provide the compiled code to the trusted computing system or the trusted setup algorithm as a part of the input to generate the CRS and the pair of the proving and verification keys. After the CRS or the proving and verification keys have been generated, the trusted computing system may be entrusted to destroy the secret key that was used in the trusted setup algorithm to generate the CRS and proving and verification keys, in order to prevent malicious parties from using the secret key to help fabricate fake proofs for non-existent executions of the ZKP program.

The host processor or CPU 102 may provide the compiled code generated from transforming or compiling the ZKP program to the cryptographic processor 108. The software program running on the host processor or CPU 102 may identify or determine specific input to the ZKP program under the applicable ZKP protocol/framework. The host processor or CPU 102 may invoke or operate with the cryptographic processor 108 to execute the corresponding compiled code or arithmetic circuit with the specific input to the ZKP program. The ZKP program, when invoked or executed, can access and use specific private information and data along with the specific input to generate specific output based at least in part on the specific input. The software program running on the host processor or CPU 102 may invoke the cryptographic processor 108 to generate a specific (secret) witness using the specific input and output as well as internal variable generated in executing the ZKP program.

In addition, the host processor or CPU 102 may provide the proving key generated from the trusted setup to the cryptographic processor 108. The software program running on the host processor or CPU 102 can invoke the cryptographic processor 108 to generate a specific ZKP for the ZKP program or its execution with the specific input based at least in part on the specific witness and the proving key.

The knowledge of the specific private information and data—as well as of the internal logic used by the ZKP program to generate the specific output from the specific input and of the witness—is not conveyed in the specific ZKP by the proving computing system 100 to verifier computing systems that receive or validate (e.g., verify, accept or reject, etc.) the specific ZKP.

In some operational scenarios, the proving computing system 100 may maintain and participate in a public or private blockchain (not shown) to share information or record transactions securely with some or all of the other computing systems. For example, some or all of the shared information or recorded (e.g., fully encrypted, etc.) transactions on the blockchain or in blocks thereof may be used by the host processor or CPU 102 to generate the specific input to the ZKP program in the present example. Additionally, optionally or alternatively, some or all CRSs, proving keys, verification keys, ZKPs, etc., may be recorded, maintained or accessed with the blockchain.

As used herein, a blockchain may refer to a decentralized or distributed digital database or ledger that is maintained by a network of many nodes or computers—including but not limited to the proving computing system 100—to share or record (e.g., fully encrypted, etc.) information or transactions across the network so that the information or transactions as recorded with blocks on the blockchain cannot be altered retroactively without altering all subsequent blocks on the blockchain and/or without all consensus of the network of the nodes or computers. At any given time, each of these nodes or computers may update, synchronize, or maintain its own local copy of the blockchain.

2.2. Cryptographic Processor

The proving computing system 100 may comprise a cryptographic processor 108 that operates in conjunction with other components or modules such as the host processor or CPU 102 to generate specific zero-knowledge proofs (ZKPs) relating to executing ZKP programs with specific inputs.

Example ZKPs generated by the cryptographic processor 108 may include, but are not necessarily limited to only, zero-knowledge Succinct Non-interactive Argument of Knowledge (zk-SNARK) proofs. In the previous example, the specific ZKP for the ZKP program with the specific input may be a zk-SNARK proof constructed by the proving computing system 100 or the cryptographic processor 108 therein to prove possession of the private (or secret) information/data accessed by a ZKP program by way of proving the knowledge of the specific witness. The zk-SNARK proof can be conveyed and verified without revealing that private information/data and/or without any (e.g., online, realtime, runtime, etc.) interaction between the proving computing system (or prover) 102 that generates and provides the zk-SNARK proof and a verifying computing system (or verifier) that receives and verifies the zk-SNARK proof.

Figure 2:
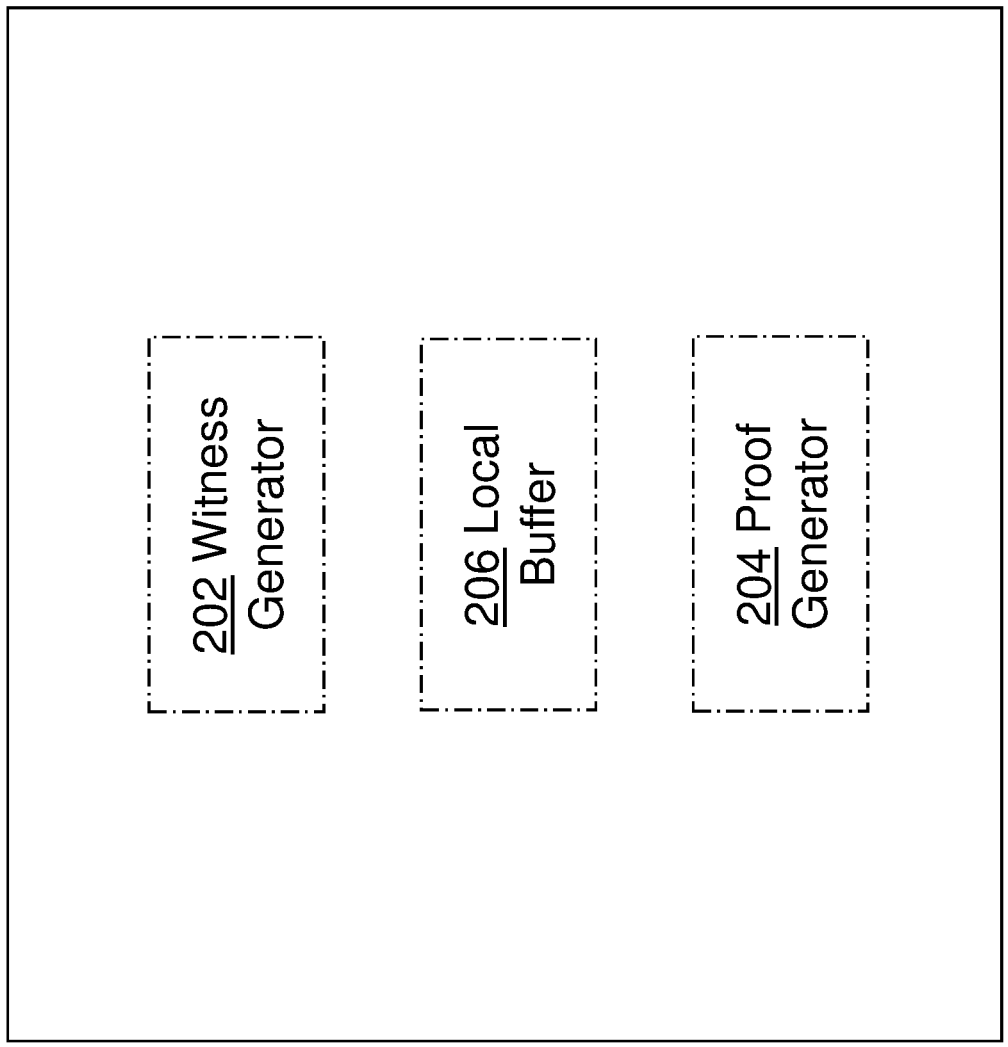
FIG. 2 illustrates an example cryptographic processor.

FIG. 2 illustrates an example configuration of the cryptographic processor 108 of FIG. 1 in an embodiment. As shown, the cryptographic processor 108 may comprise a witness generator 202, a proof generator 204, local cryptographic data buffer or cache 206 (local to or reside with the cryptographic processor 108 or the proof generator 204), and so on. Some or all of the processing components described herein are implemented in a semiconductor hardware device or circuit representing a hardware accelerator, an application-specific integrated circuit (ASIC), a field programmable gate array (FPGA), a microcontroller, a graphics processing unit (GPU), or another integrated circuit. Some or all of the processing components may include one or more memories storing instructions for implementing various components described herein, one or more hardware processors configured to execute the instructions stored in the one or more memories, and various data repositories in the one or more memories for storing data structures utilized and manipulated by the various components.

In various operational scenarios, the cryptographic processor 108 may include more or fewer processing components than illustrated in FIG. 2. For example, the cryptographic processor 108 may include computing devices or processing components in addition to or in place of the witness generator 202, the proof generator 204, the local data buffer or cache 206, and so on.

To generate the ZKP or zk-SNARK proof, the cryptographic processor 108 or the witness generator 202 therein may first perform or execute operations for witness generation, which uses the compiled code or arithmetic circuit as well as specific input to the ZKP program as received from the host processor or CPU 102 to generate a witness and store the witness in the local buffer or cache 206 of the cryptographic processor 108. Subsequently, the cryptographic processor 108 or the proof generator 204 therein may perform or execute operations for proof generation, which accesses and uses the generated witness maintained or stored in the local buffer or cache 206 and proceeds to further generate or derive the ZKP or zk-SNARK proof from the witness.

The data size or length of the zk-SNARK proof can be relatively small such as a few hundred bytes, regardless of whether the data size or length of ZKP program that processes or accesses the private information/data are much larger (e.g., 100 times, 1000 times, 10000 times, etc.) than the zk-SNARK proof, and/or regardless of whether the data size or length of a witness constructed from input, output and internal variables in an arithmetic circuit generated by compiling the program logic or code are much larger (e.g., 100 times, 1000 times, 10000 times, etc.) than the zk-SNARK proof, and/or regardless of whether the data size or length of the private data (e.g. a list containing numerous entries, a transaction list containing millions or billions of online transactions, etc.) may be much larger than the zk-SNARK proof.

Hence, the zk-SNARK proof can be relatively efficiently and expeditiously verified or validated by the verifier, for example within a relatively small bounded time window such as a few milliseconds, a few sub-milliseconds, etc., that is independent of the size or length of the ZKP program or the witness or the private information/data.

In some operational scenarios, bi-directional or back-and-forth interactions or message exchanges between the prover and the verifier are not needed for proof generation by the prover and/or for verification by the verifier. For example, the zk-SNARK proof as described herein may be generated by the proving computing system 100 offline or online, and may subsequently be sent or otherwise provided by the proving computing system 100 to a verifier computing system in a single (e.g., application-level, etc.) message.

2.3. Memory Controller

The proving computing system 100 may comprise a memory controller 104, which may be used to perform memory access operations such as read and/or write operations with respect to data items stored in host memory 106. The proving computing system 100—or the host processor or CPU 102 therein—may include or operate with (e.g., multi-level, etc.) caches or cache storages with cache lines for temporarily storing data items retrieved or originated from corresponding core lines including instructions and/or data (e.g., ZKP programs, proving keys, input to ZKP programs, etc.) for software programs in the host memory 106.

During operations at runtime, the host processor or CPU 102— or a caching mechanism operating in conjunction with the host processor or CPU 102— may carry out reads and/or writes to the host memory 106 by way of the memory controller 104.

2.4. Host Memory

The proving computing system 100 may comprise host memory 106, which may store data items that can be accessed through the memory controller 104. The host memory 106 may include or operate with, or may be attached with, one or more memory regions implemented with one or more types of memory components (e.g., dynamic random access memory or DRAM, PCRAM, MRAM, ReRAM, NAND, NOR, DIMMs, SSDs, flashes, non-volatile memory, volatile memory, etc.).

2.5. Communication Interface(s)

The proving computing system 100 may comprise one or more communication interfaces 110 used by a processor core such as a host processor or CPU 102 in the proving computing device 100 to communicate with one or more other computers or nodes over one or more computer networks, data links or paths using one or more data or network communication protocols.

2.6. Witness Generator

As illustrated in FIG. 2, the cryptographic processor 108 of the proving computing system 100 may comprise a witness generator 202 that operates in conjunction with other components or modules such as the host processor or CPU 102 to generate witnesses for a given ZKP program based at least in part on specific inputs to the ZKP program. The witness generator 202 may receive or access compiled code with a plurality of elementary statements representing a plurality of gates forming an arithmetic circuit equivalent to the ZKP program.

The witness generator 202 may include logic components specifically optimized to carry out operations specified by operators in the elementary statements in the compiled code. Once specific input to the ZKP program is provided by the host computing processor or CPU 102, the witness generator 202 can execute all steps as specified by all the elementary statements or corresponding gates in the compiled code to generate intermediate variable values and corresponding output value. The input, output and intermediate variable values may be collected and written/recorded into a specific witness in connection with executing the ZKP program with the specific input. The specific witness may be stored or buffered by the witness generator 202 in the local buffer 206.

The witness generation may be repeated by the witness generator 202 concurrently or sequentially for different ZKPs, or for different specific inputs to the same ZKP.

2.7. Proof Generator

As illustrated in FIG. 2, the cryptographic processor 108 of the proving computing system 100 may comprise a proof generator 204 that operates in conjunction with other components or modules such as the host processor or CPU 102 and the witness generator 202 to generate proofs for a given ZKP program based at least in part on specific witnesses generated by the witness generator 202 for the ZKP program with specific inputs. The proof generator 204 can access or read these specific witnesses in the local buffer 206.

Under techniques as described herein, the proof generator 204 that accesses the specific witnesses, the witness generator 202 that generates the specific witnesses, and the local buffer that are used by the proof generator 204 and the witness generator 202 to read and write the specific witnesses, may be integrated in the same hard accelerator such as a single semiconductor chip or integrated circuit, instead of storing these witnesses in host memory (e.g., 106 of FIG. 1, etc.). Under these techniques, there is no need for a host processor or CPU (e.g., 102 of FIG. 1, etc.) to be involved in accessing, reading or writing the witnesses through a host-managed memory controller (e.g., 104 of FIG. 1, etc.).

Example benefits that are realized with techniques as described herein may include, but are not necessarily limited to only, reduced latency and enhanced security. For example, a witness may be several orders of magnitude larger than the maximum memory access bandwidth per CPU cycle supported by the host managed memory controller.

Under other approaches that do not implement the techniques as described herein, accessing the witness would take hundreds, thousands or even more of CPU cycles. In comparison, under the techniques as described herein, such a witness may be read or written by the proof generator 204 and the witness generator 202 from or to the local buffer 206 in relatively small bounded time window down to a single CPU cycle.

In addition, under other approaches, the witness would be stored in the host memory accessed through the host managed memory controller and would be relatively more exposed to snooping or malicious access by other components in the same device or other devices in the same network, etc. In comparison, under the techniques as described herein, the local buffer 206 may be secured or restricted to be accessed by the witness generator 202 or the proof generator 204 on the same hardware accelerator only. As a result, snooping or malicious access can be effectively prevented.

Figure 3:
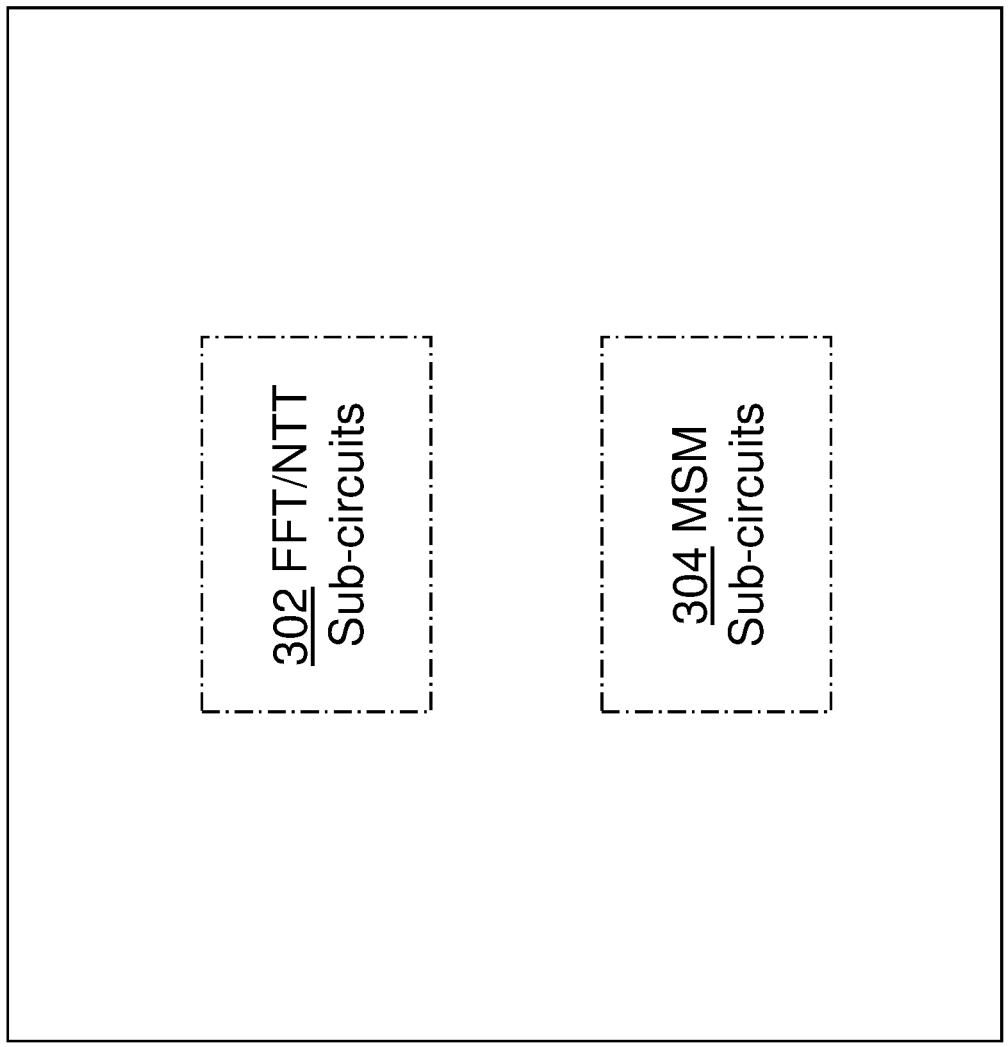
FIG. 3 illustrates example computation unit sub-circuits in a cryptographic processor.

The proof generator 204 may include logic components—such as one or more fast Fourier transformation (FFT) or number theoretic transformation (NTT) sub-circuits 302, one or more multi-scalar multiplication (MSM) sub-circuits 304, as illustrated in FIG. 3—specifically optimized to carry out optimized or accelerated proof generation operations that generate specific zero-knowledge proofs corresponding to the specific witnesses as produced by the witness generator 202 and read from the local buffer 206.

In some operational scenarios, some or all of these specific zero-knowledge proofs generated by the proof generator 204 may be zk-SNARK proofs. Any, some or all of these zk-SNARK proofs generated by the proof generator 204 may be provided by the hardware accelerator to the host processor or CPU 102 for the latter to carry out zk-SNARK protocol operations with other computing systems such as verifier computing systems to verify or validate the proofs in accordance with operational frameworks implemented in one or more zk-SNARK applications.

Once a specific witness is generated by the witness generator 202 for a ZKP program with specific input and stored/maintained in the local buffer 206, the proof generator 204 can access or read the specific witness from the local buffer 206 and execute all (e.g., parallelized, optimized, computationally intensive, etc.) proof generation operations to generate a specific zk-SNARK proof corresponding to or based at least in part on the specific witness.

In some operational scenarios such as in a Groth16 ZKP operational framework or protocol, as a part of witness and/or proof generation, a triplet of vectors in a rank-1 constraint system (R1CS) for polynomial interpolation and further proof generation can be generated by the proving computing system 100 implementing the Groth16 ZKP framework/protocol from gates in compiled code generated by transforming or compiling the ZKP program. The specific witness may be written as a witness vector in the same format or order as how each of the vectors in the R1CS is written. For example, the specific witness may be represented as a vector or a one-dimensional matrix with a plurality of vector/matrix components each of which represents or specifies a respective value among input, output and intermediate variable values in executing the gates or statements of the compiled ZKP program. The witness generator (202) may store or write the specific witness (or corresponding vector) derived with the specific input in the local (data or witness) buffer 206, for example along with the vectors in the R1CS.

In some operational scenarios such as in a non-Groth16 ZKP operational framework/protocol, as a part of witness and/or proof generation, different constraint systems or different relations or data entities, or different representations—other than or different from those derived from the R1CS and/or arithmetic circuits—can be used in witness and/or proof generation by the proving computing system 100. Additionally, optionally, alternatively, the specific witness as described herein may be represented, derived, specified or defined using different (e.g., non-R1CS constraint system, etc.) relations or data entities other than R1CS or arithmetic circuit relations or data entities. In these operational scenarios, the specific witness may be represented in a different form other than a vector or a one-dimensional matrix using input, output and intermediate variable values in executing the gates or statements of the compiled ZKP program or arithmetic circuit. Nevertheless, under techniques as described herein, the witness generator (202) may store or write the specific witness represented, derived, specified or defined in the non-Groth16 ZKP operational framework/protocol in the local (data or witness) buffer 206. The specific witness may be accessed by the proof generator 204 to produce the corresponding ZKP for executing the ZKP program with the specific input.

Example non-Groth16 ZKP frameworks/protocols as described herein may include, but are not necessarily limited to only, any of: ZKP operational frameworks/protocols using polynomial evaluations and/or Merkle-tree generation to produce ZKPs; ZKP operational frameworks/protocols in which ZKP generation operations are performed under one of (e.g., homogeneous power, elliptic curve, bilinear group, group of unknown order, pure hash function, etc.) polynomial commitment scheme, multilinear (polynomial) commitment scheme, and linear (function) commitment scheme; ZKP operational frameworks/protocols using transparent setups to generate Structured Reference Strings (SRSs) and/or CRS s and/or corresponding proving/verification keys; ZKP operational frameworks/protocols using SRSs or CRS s that are updatable or alternatively static; PlonK ZKP operational frameworks/protocols; STARK ZKP operational frameworks/protocols; Fractal ZKP operational frameworks/protocols; Halo ZKP operational frameworks/protocols; Sonic or SuperSonic ZKP operational frameworks/protocols; Marlin ZKP operational frameworks/protocols; and so forth. In such non-Groth16 ZKP operational framework/protocol, a different constraint system other than the R1CS and/or arithmetic circuit may be used to represent the compiled ZKP program. Additionally, optionally or alternatively, in such non-Groth16 ZKP operational framework/protocol, the specific witness may be written in a representation other than one written as a witness vector in the same format or order as how each of the vectors in the R1CS is written.

The proof generation may be repeated by the proof generator 204 concurrently or sequentially for different ZKPs, or for different specific inputs to the same ZKP.

2.8. Local Buffer

As illustrated in FIG. 2, the cryptographic processor 108 of the proving computing system 100 may comprise a local buffer 206 that operates in conjunction with other components or modules such as the witness generator 202 and the proof generator 204 to store or buffer witnesses for ZKP programs based at least in part on specific inputs to the ZKP programs. The local buffer 206 may be optimized or implemented to support storing or writing a witness generated by the witness generator 202 in a relatively small bounded time window such as a single cycle (e.g., CPU clock cycle, etc.) of a reference clock source used by the hardware accelerator that integrates the witness generator 202, the proof generator 204 and the local buffer 206. Additionally, optionally or alternatively, the local buffer 206 may be optimized or implemented to support accessing or reading a witness by the proof generator 204 in a relatively small bounded time window such as a single cycle (e.g., CPU clock cycle, etc.) of the reference clock source.

2.9. Miscellaneous

The foregoing figures illustrate only a few examples in which the techniques described herein may be practiced. Other embodiments may include fewer and/or additional components in varying arrangements.

3.0. Functional Overview

For ZKP use cases or applications to be practical, overall witness and proof generation time needs to be reduced. A proving computing system (e.g., 100 of FIG. 1, etc.) may implement some or all hardware acceleration techniques as described herein to significantly reduce the overall witness and proof generation time. Example proving computing systems as described herein may include, but are not necessarily limited to only, any of: proving computing systems using R1CS constraint systems and/or arithmetic circuits to produce ZKPs; proving computing systems using polynomial evaluations and/or Merkle-tree generation to produce ZKPs; proving computing systems performing ZKP generation operations under one of (e.g., homogeneous power, elliptic curve, bilinear group, group of unknown order, pure hash function, etc.) polynomial commitment scheme, multilinear (polynomial) commitment scheme, and linear (function) commitment scheme; proving systems using trusted setups to generate CRSs and corresponding proving/verification keys; proving systems using transparent setups to generate Structured Reference Strings (SRSs) and/or CRSs and/or corresponding proving/verification keys; proving systems using SRSs or CRSs that are updatable; proving systems using SRSs or CRSs that are static; Groth16 proving systems; PlonK (e.g., Plonky 2, etc.) proving systems; zk-STARK proving systems; Fractal proving systems; Halo proving systems; Sonic or SuperSonic proving systems; Marlin proving systems; and so.

3.1. Witness Generation

In a ZKP proving computing system such as a zk-SNARK proving system, witness generation is to execute an arithmetic circuit with specific input, and record all the input, intermediate and output results from (reading out) each wire of each gate in the arithmetic circuit. The arithmetic circuit as generated from transforming or compiling a corresponding (e.g., real, useful, actual, typical, implemented, etc.) ZKP program may typically involve or include millions or more gates each of which may have two or three wires. Hence, a witness generated from walking these numerous gates and wires from input to output—or executing corresponding statements in the compiled ZKP program—may produce millions of elements each of which may be represented in a relatively large prime field such as a 254-bit or 256 (or more) bit prime field or the like.

Proof generation is typically seen as a separate step performed after witness generation. While the proof generation may be implemented on hardware acceleration, the witness generation may be implemented apart from the proof generation, for example, with a host processor or CPU.

Under some approaches that do not implement techniques as described herein, as a witness can be relatively long, memory access operations to transfer the witness from the witness generation to the proof generation may incur significant overheads and time latency in copying operations and extra storage or memory usages.

For example, under these approaches, a host processor or CPU (e.g., 102 of FIG. 1, etc.) may be used to generate a witness and read/write the witness in host memory (e.g., 106 of FIG. 1, etc.) accessed with host-based bus or memory controller (e.g., 104 of FIG. 1, etc.). The host-based bus or memory controller supports limited memory read/write bandwidth such as 32 bytes, 64 bytes or 128 bytes at each CPU cycle. While such memory access bandwidth to the host memory may be sufficient for general (e.g., non-ZKP specific, etc.) computing purposes, copying and storing/reading a witness of millions or more of bytes generated in a ZKP application may have to be supported under these approaches through memory access serialization or multiple round trips between different ICs over many consecutive CPU or clock cycles, which would incur a relatively large time latency.

In comparison, under hardware acceleration techniques as described herein, a proving computing system such as 100 of FIG. 1 can implement a hardware accelerator that integrates witness generation and proof generation. In addition, witnesses generated by a witness generator on the hardware accelerator can be stored away from the host memory and rather stored locally with the hardware accelerator. A proof generator on the same hardware accelerator can access any, some or all of these witnesses locally stored on the hardware accelerator within a relatively small bounded time window such as a single CPU or clock cycle. Hence, the techniques as described herein can eliminate or significantly reduce overheads and time latency in copying operations and extra storage or memory usages that would be incurred in host-based (non-accelerator) memory access operations, thereby achieving an end-to-end acceleration in hardware for both witness and proof generation, enhancing or ensuring data security, and significantly reducing overall witness and proof generation time in actual ZKP applications.

3.2. Proof Generation

For each ZKP program, an arithmetic circuit represented by a compiled version of the ZKP program is the same. A host processor or CPU (e.g., 102 of FIG. 1, etc.) or a software program running thereon may be used to carry out or invoking compiling the ZKP program into the arithmetic circuit. The arithmetic circuit can then be transferred by the host processor or CPU 102 to the hardware accelerator (or acceleration hardware), along with a CRC (common reference string) or a pair of proving and verification keys generated from a trusted setup performed by the host processor or CPU 102. Subsequently, the host processor or CPU 102 or the software program running thereon can (e.g., singly, multiple times, etc.) invoke, or operate with the hardware accelerator to execute, the ZKP program or its compiled version or the corresponding arithmetic circuit.

Different inputs may be fed or provided by the host processor or CPU 102 to the hardware accelerator at invocation or (ZKP program) execution. The host processor or CPU can request the hardware accelerator to execute the compiled ZKP program or arithmetic circuit with these different inputs. Different witnesses and/or outputs can be generated or decided by the hardware accelerator based at least in part on the different inputs to the same algebraic circuit. Correspondingly, different ZKPs or zk-SNARK proofs can be generated by the hardware accelerator based at least in part on the different witnesses.

Proof generation that produces a specific ZKP or zk-SNARK proof from a specific witness of executing the compiled ZKP program or arithmetic circuit with specific input involves various types of numeric computations such as fast Fourier transformation (FFT) or number theoretic transformation (NTT), multi-scalar multiplication (MSM), etc.

Under techniques as described herein, the same hardware accelerator that includes a witness generator (e.g., 202 of FIG. 2, etc.) to locally generate and store witnesses also includes a proof generator (e.g., 204 of FIG. 2, etc.) with optimized circuits or sub-circuits as illustrated in FIG. 3 to carry out specific proof generation operations that generate ZKPs or zk-SNARK proofs corresponding to the witnesses. Once a proof corresponding to a witness generated with specific input is generated by the proof generator 204, the host processor or CPU 102 may access, read, receive or otherwise use the proof in further ZKP operations within the proving computing system 100 and/or with other computing systems.

Invocation of different combinations, different sequences and/or different types of FFT/NTT and MSM computations can be controlled, specified or driven by the (e.g., dynamically configured, updatable in the field, periodically configurable, etc.) software program running on the host processor or CPU 102 for the purpose of accommodating or supporting different ZKP protocols or different ZKP operational frameworks or different ZKP applications. Additionally, optionally or alternatively, invocation of different combinations, different sequences and/or different types of FFT/NTT and MSM computations can be controlled, specified or driven by (e.g., dynamically configured, updatable in the field, periodically configurable, etc.) software, firmware and/or microcode deployed with the hardware accelerator for the same or similar purpose. For example, mathematical constructs or data structures (e.g., relating to prime field operations, etc.) can be controlled, specified or driven by the microcode to accommodate or support different mathematical parameters (e.g., BN128, BLS12-381, etc.) including those that may emerge in the future after the proving computing system 100 or the hardware accelerator has been deployed in the field.

In some operational scenarios, an arithmetic circuit corresponding to a ZKP program can first be preprocessed for example by the host processor or CPU 102, the hardware accelerator or the witness generator 202 therein into a mathematically equivalent arithmetic circuit that produces the same result as the pre-optimized arithmetic circuit but is optimized for parallel execution to shorten the time needed to execute the ZKP program in order to harness parallel capabilities of the acceleration hardware.

3.3. Example Process Flows

Figure 4:
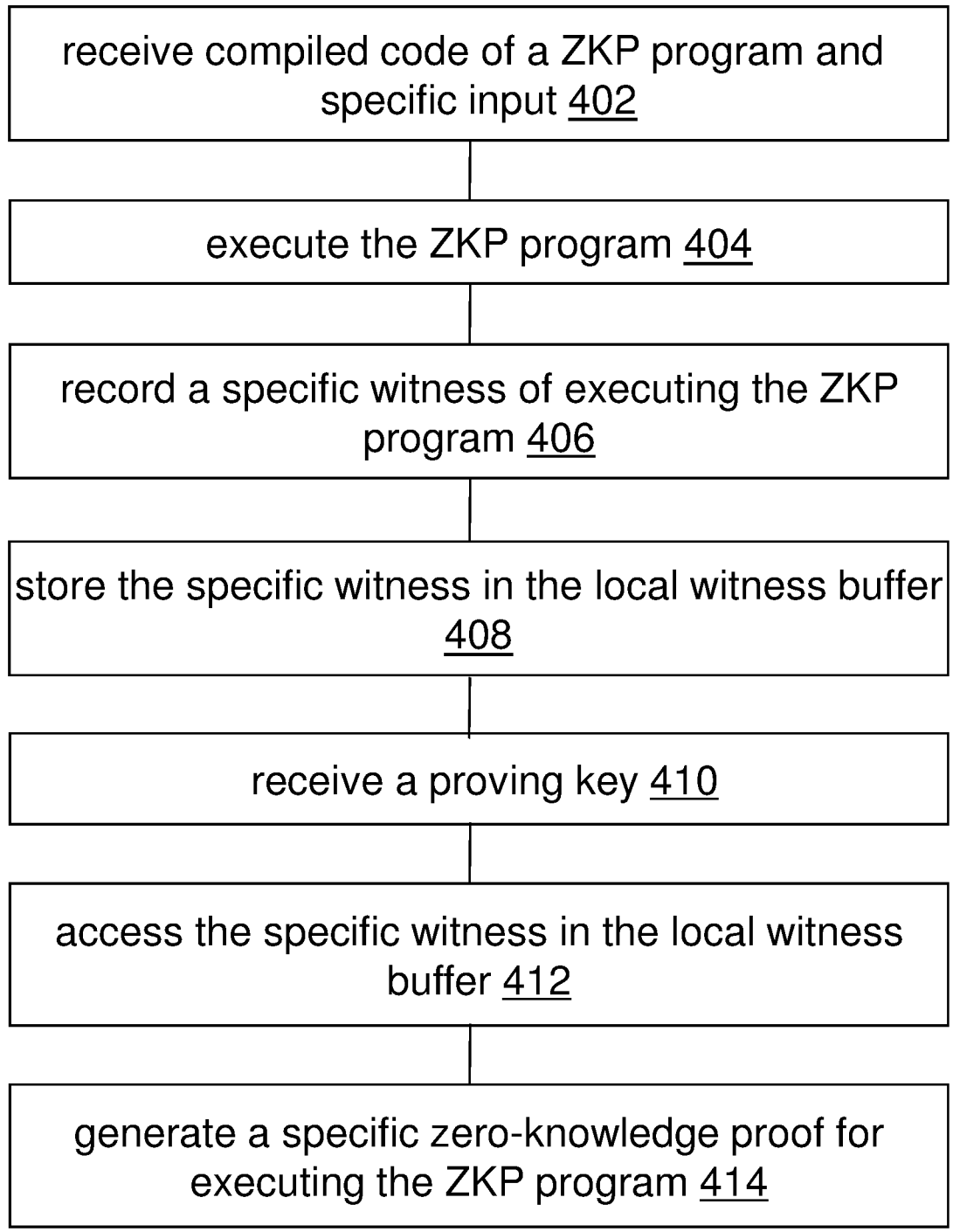
FIG. 4 illustrates an example process flow.

FIG. 4 illustrates an example process flow, according to an embodiment. The various elements of the flow described below may be performed with one or more computing devices. A local witness buffer is integrated with a witness generator and a proof generator on a cryptographic processor and is separate from host memory accessed by a host processor operating with the cryptographic processor in a proving computing system. In block 402, the witness generator receives, by from software program running on the host processor, compiled code of a zero-knowledge-proof (ZKP) program and specific input to the ZKP program.

In block 404, the witness generator executes the ZKP program by way of executing the compiled code.

In block 406, the witness generator records specific output generated from the ZKP program with the specific input, intermediate variable values, and the specific input, as a specific witness of executing the ZKP program.

In block 408, the witness generator stores the specific witness in the local witness buffer.

In block 410, the proof generator receives, from the software program running on the host processor, a proving key.

In block 412, the proof generator accesses the specific witness in the local witness buffer.

In block 414, the proof generator generates a specific zero-knowledge proof for executing the ZKP program with the specific input.

In an embodiment, the specific proof is published by the proving computing system to a blockchain maintained by a network of computing nodes that include the proving computing system.

In an embodiment, a verifier computing system accesses the specific proof generated by the cryptographic processor and validates the specific proof based at least in part on a verification key generated concurrently with the proving key in a trusted setup.

In an embodiment, the ZKP program accesses private data not shared by the proving computing system with other computing systems including one or more verifier computing systems that validate the specific proof.

In an embodiment, the compiled code defines an arithmetic circuit formed by a plurality of gates represented by a plurality of elementary statements in the compiled code; each gate in the plurality of gates is formed at least in part by input and output wires; the specific witness includes values read out from all wires of all gates in the plurality of gates of the arithmetic circuit.

In an embodiment, the cryptographic processor comprises a plurality of computation units for performing parallel computations relating to one or more of: fast Fourier transformation, number theoretic transformation, multi-scalar multiplication, etc.

In an embodiment, the cryptographic processor is implemented as one of: a single semiconductor device, a single integrated circuit, a single semiconductor chip that includes one or more chiplets, etc.

In an embodiment, the specific witness has a data size exceeding a maximum supported memory access bandwidth of the host memory for a single clock cycle; the specific witness is accessed in its entirety by the proof generator over a first total number of clock cycles fewer than a second total number of clock cycle over which host memory stored data of the same data size is accessed from the host memory.

In an embodiment, a computing device such as a server, one or more computing processors or chips or chipsets on a server board, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

4.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 5:
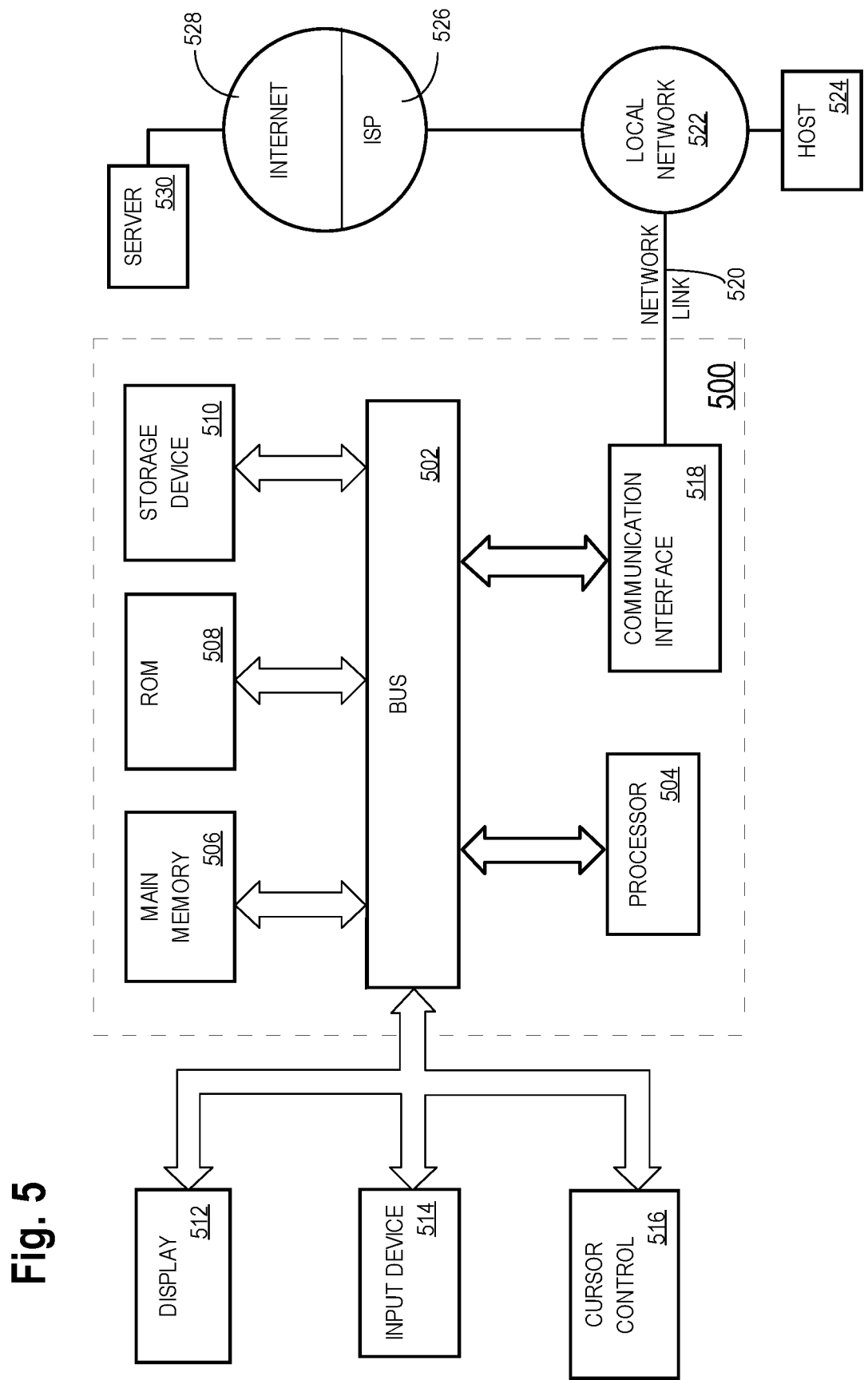
FIG. 5 is block diagram of a computer system upon which embodiments of the inventive subject matter may be implemented.

FIG. 5 is a block diagram that illustrates a computer system 500 that may be utilized in implementing the above-described techniques, according to an embodiment. Computer system 500 may be, for example, a desktop computing device, laptop computing device, tablet, smartphone, server appliance, computing mainframe, multimedia device, handheld device, networking apparatus, or any other suitable device. In an embodiment, FIG. 5 is a different view of the devices and systems described in previous sections.

Computer system 500 may include one or more ASICs, FPGAs, or other specialized circuitry 503 for implementing program logic as described herein. For example, circuitry 503 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 500 may include one or more hardware processors 504 configured to execute software-based instructions. Computer system 500 may also include one or more busses 502 or other communication mechanism for communicating information. Busses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes one or more memories 506, such as a RAM, hardware registers, or other dynamic or volatile storage device for storing data units to be processed by the one or more ASICs, FPGAs, or other specialized circuitry 503. Memory 506 may also or instead be used for storing information and instructions to be executed by processor 504. Memory 506 may be directly connected or embedded within circuitry 503 or a processor 504. Or, memory 506 may be coupled to and accessed via bus 502. Memory 506 also may be used for storing temporary variables, data units describing rules or policies, or other intermediate information during execution of program logic or instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, may optionally be provided and coupled to bus 502 for storing information and instructions.

A computer system 500 may also include, in an embodiment, one or more communication interfaces 515 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send packets and receive data through the network(s), network link 520, and communication interface 518. In some embodiments, this data may be data units that the computer system 500 has been asked to process and, if necessary, redirect to other computer systems via a suitable network link 520. In other embodiments, this data may be instructions for implementing various processes related to the described techniques. For instance, in the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

Computer system 500 may optionally be coupled via bus 502 to one or more displays 512 for presenting information to a computer user. For instance, computer system 500 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

One or more input devices 514 are optionally coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

As discussed, computer system 500 may implement techniques described herein using customized hard-wired logic, one or more ASICs or FPGAs 503, firmware and/or program logic, which in combination with the computer system causes or programs computer system 500 to be a special-purpose machine. According to one embodiment, however, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 506, from which processor 504 retrieves and executes the instructions. The instructions received by main memory 506 may optionally be stored on storage device 510 either before or after execution by processor 504.

5.0 Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A proving computing system comprising:
a host processor that executes a software program; and a cryptographic processor that integrates a witness generator, a proof generator and a local witness buffer, wherein the local witness buffer integrated with the witness generator and the proof generator on the cryptographic processor is separate from host memory accessed by the host processor;
wherein the cryptographic processor including the witness generator, the proof generator and the local witness buffer is implemented as a semiconductor device separate from the host processor;
wherein the witness generator on the cryptographic processor (a) receives, from the software program running on the host processor, compiled code of a zero-knowledge-proof (ZKP) program and specific input to the ZKP program, (b) executes the ZKP program by way of executing the compiled code, (c) records specific output generated from the ZKP program with the specific input, intermediate variable values, and the specific input, as a specific witness of executing the ZKP program, and (d) stores the specific witness in the local witness buffer;
wherein the specific witness has a data size exceeding a maximum supported memory access bandwidth of the host memory for a single clock cycle;
wherein the proof generator on the cryptographic processor (e) receives, from the software program running on the host processor, a proving key that was generated along with a verification key, (f) accesses the specific witness in the local witness buffer, wherein the specific witness is accessed in its entirety by the proof generator over a first total number of clock cycles fewer than a second total number of clock cycles over which host memory stored data of the same data size is accessed from the host memory and (g) generates a specific zero-knowledge proof for executing the ZKP program with a combination of the proving key, the specific witness and the specific input;
wherein a recipient computing system that receives the verification key and the specific zero-knowledge proof validates the specific zero-knowledge proof with the verification key.

2. The proving computing system of claim 1, wherein a verifier computing system accesses the specific zero-knowledge proof generated by the cryptographic processor and validates the specific proof based at least in part on the verification key generated concurrently with the proving key in a trusted setup.

3. The proving computing system of claim 1, wherein the ZKP program accesses private data not shared by the proving computing system with other computing systems including one or more verifier computing systems that validate the specific zero-knowledge proof.

4. The proving computing system of claim 1, wherein the compiled code defines an arithmetic circuit formed by a plurality of gates represented by a plurality of elementary statements in the compiled code; wherein each gate in the plurality of gates is formed at least in part by input and output wires; wherein the specific witness includes values read out from all wires of all gates in the plurality of gates of the arithmetic circuit.

5. The proving computing system of claim 1, wherein the cryptographic processor comprises a plurality of computation logics for performing parallel computations relating to one or more of: fast Fourier transformation, number theoretic transformation, or multi-scalar multiplication.

6. The proving computing system of claim 1, wherein the cryptographic processor is implemented as one of: a single semiconductor device, a single integrated circuit, or a single semiconductor chip that includes one or more chiplets.

7. A cryptographic processor comprising:
a witness generator;
a proof generator; and
a local witness buffer;
wherein the local witness buffer is integrated with the witness generator and the proof generator on the cryptographic processor and is separate from host memory accessed by a host processor operating with the cryptographic processor in a proving computing system;
wherein the cryptographic processor including the witness generator, the proof generator and the local witness buffer is implemented as a semiconductor device separate from the host processor;
wherein the witness generator on the cryptographic processor (a) receives, from software program running on the host processor, compiled code of a zero-knowledge-proof (ZKP) program and specific input to the ZKP program, (b) executes the ZKP program by way of executing the compiled code, (c) records specific output generated from the ZKP program with the specific input, intermediate variable values, and the specific input, as a specific witness of executing the ZKP program, and (d) stores the specific witness in the local witness buffer; wherein the specific witness has a data size exceeding a maximum supported memory access bandwidth of the host memory for a single clock cycle;
wherein the proof generator on the cryptographic processor (e) receives, from the software program running on the host processor, a proving key that was generated along with a verification key, (f) accesses the specific witness in the local witness buffer, wherein the specific witness is accessed in its entirety by the proof generator over a first total number of clock cycles fewer than a second total number of clock cycles over which host memory stored data of the same data size is accessed from the host memory, and (g) generates a specific zero-knowledge proof for executing the ZKP program with a combination of the proving key, the specific witness and the specific input;
wherein a recipient computing system that receives the verification key and the specific zero-knowledge proof validates the specific zero-knowledge proof with the verification key.

8. The cryptographic processor of claim 7, wherein a verifier computing system accesses the specific zero-knowledge proof generated by the cryptographic processor and validates the specific zero-knowledge proof based at least in part on the verification key generated concurrently with the proving key in a trusted setup.

9. The cryptographic processor of claim 7, wherein the ZKP program accesses private data not shared by the proving computing system with other computing systems including one or more verifier computing systems that validate the specific zero-knowledge proof.

10. The cryptographic processor of claim 7, wherein the compiled code defines an arithmetic circuit formed by a plurality of gates represented by a plurality of elementary statements in the compiled code; wherein each gate in the plurality of gates is formed at least in part by input and output wires; wherein the specific witness includes values read out from all wires of all gates in the plurality of gates of the arithmetic circuit.

11. The cryptographic processor of claim 7, wherein the cryptographic processor comprises a plurality of computation logics for performing parallel computations relating to one or more of: fast Fourier transformation, number theoretic transformation, or multi-scalar multiplication.

12. The cryptographic processor of claim 7, wherein the cryptographic processor is implemented as one of: a single semiconductor device, a single integrated circuit, or a single semiconductor chip that includes one or more chiplets.

13. A method comprising:
wherein a local witness buffer is integrated with a witness generator and a proof generator on a cryptographic processor and is separate from host memory accessed by a host processor operating with the cryptographic processor in a proving computing system;
wherein the cryptographic processor including the witness generator, the proof generator and the local witness buffer is implemented as a semiconductor device separate from the host processor;
receiving, by the witness generator from software program running on the host processor, compiled code of a zero-knowledge-proof (ZKP) program and specific input to the ZKP program;
executing, by the witness generator, the ZKP program by way of executing the compiled code;
recording, by the witness generator, specific output generated from the ZKP program with the specific input, intermediate variable values, and the specific input, as a specific witness of executing the ZKP program;
storing, by the witness generator, the specific witness in the local witness buffer;
wherein the specific witness has a data size exceeding a maximum supported memory access bandwidth of the host memory for a single clock cycle;
receiving, by the proof generator from the software program running on the host processor, a proving key that was generated along with a verification key;
accessing, by the proof generator, the specific witness in the local witness buffer, wherein the specific witness is accessed in its entirety by the proof generator over a first total number of clock cycles fewer than a second total number of clock cycles over which host memory stored data of the same data size is accessed from the host memory;

generating, by the proof generator, a specific zero-knowledge proof for executing the ZKP program with a combination of the proving key, the specific witness and the specific input;

causing a recipient computing system that receives the verification key and the specific zero-knowledge proof to validate the specific zero-knowledge proof with the verification key.

14. The method of claim 13, wherein a verifier computing system accesses the specific zero-knowledge proof generated by the cryptographic processor and validates the specific zero-knowledge proof based at least in part on the verification key generated concurrently with the proving key in a trusted setup.

15. The method of claim 13, wherein the ZKP program accesses private data not shared by the proving computing system with other computing systems including one or more verifier computing systems that validate the specific zero-knowledge proof.

16. The method of claim 13, wherein the compiled code defines an arithmetic circuit formed by a plurality of gates represented by a plurality of elementary statements in the compiled code; wherein each gate in the plurality of gates is formed at least in part by input and output wires; wherein the specific witness includes values read out from all wires of all gates in the plurality of gates of the arithmetic circuit.

17. The method of claim 13, wherein the cryptographic processor comprises a plurality of computation logics for performing parallel computations relating to one or more of: fast Fourier transformation, number theoretic transformation, or multi-scalar multiplication.

18. The method of claim 13, wherein the cryptographic processor is implemented as one of: a single semiconductor device, a single integrated circuit, or a single semiconductor chip that includes one or more chiplets.

* * * * *